2,887,577

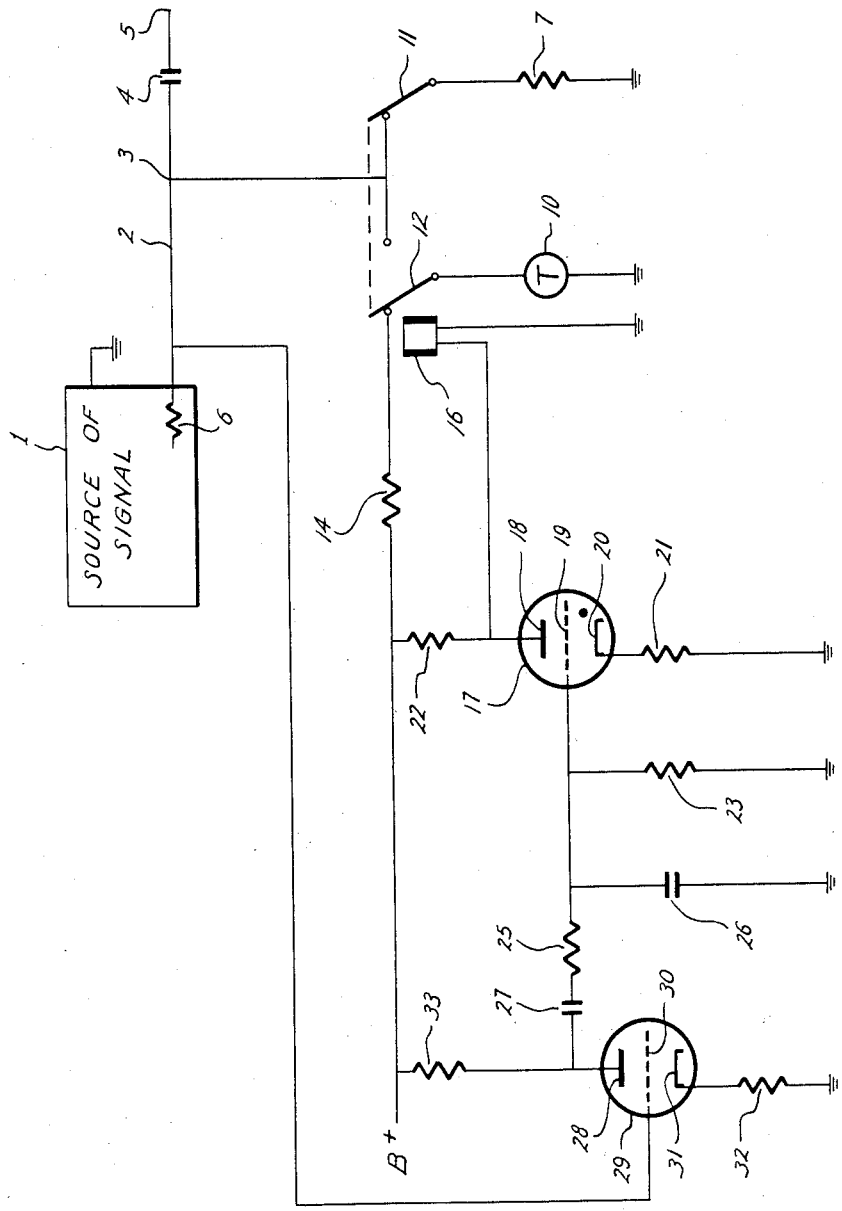

MEANS FOR ATTENUATING A SIGNAL IN PREDETERMINED PATTERNS

Louis W. Erath, Bellaire, Tex., assignor, by mesne assignments, to Dresser Industries, Inc., Dallas, Tex., a corporation of Delaware Application February 17, 1956, Serial No. 566,226

10 Claims. (Cl. 250—27)

This invention relates to attenuating signals, and more particularly to novel means for and method of varying the attenuation of signals very rapidly over wide ranges in accordance with a predetermined pattern.

In certain arts it is common to have a signal which is very large for a short interval of time, and which fades rapidly to a signal of low amplitude. This is true of signals picked up by geophones in seismographic exploration work, wherein a shot is fired in the ground, and geophones then detect sound reflections from various formations in the earth. The shot itself is of very large magnitude, and the first sound reflections, those from formations near the surface, are of magnitude relatively greater than the later reflections from formations deeper in the earth.

It is desirable to amplify the rapidly fading signal an amount varying more or less in relation to the fade in amplitude of the reflected signals being detected by the geophone. Because of the rapidity of the fade, this is a difficult problem. It can be solved, in accordance with this invention, by attenuating the signal at some stage during its amplification in a pattern inversely approximating the fade in the signal as time elapses after the shot occurs.

Accordingly, an object of this invention is to provide novel and improved means for and method of attenuating signals in predetermined patterns.

A further object of this invention is to provide novel means for and method of varying attenuation of a signal in approximately inverse relationship to the variation in the signal to be attenuated.

Other objects are apparent from the following description and accompanying drawings.

These objects are accomplished by the use of a thermo-sensitive resistor, or thermistor, in conjunction with circuitry amounting to a voltage divider. The temperature of the thermo-sensitive resistor, as one of two resistance elements in the voltage divider, is raised or lowered to a temperature at which it has a resistance substantially equal to that of an attenuating resistor which is connected to a line carrying the signal to be attenuated. The thermo-sensitive resistor is then substituted for the attenuating resistor and the temperature of the thermo-sensitive resistor is changed in some manner, so as to change its resistance. A thermo-sensitive resistor can be chosen that will change resistance under certain conditions in a pattern effecting a voltage division that produces attenuation approximately proportional to the change in amplitude, or the inverse of the change in amplitude of the signal to be controlled.

The invention is more understandable by reference to the drawing, which is a schematic representation of the invention with appurtenant circuitry.

Assume a source of signal 1. This may be a geophone or an amplifier or any one of a variety of sources. This source supplies a signal to a line 2, having a terminal 3 therein. The terminal 3 may be coupled by a coupling condensor 4 to an output terminal 5.

The source of signal 1 includes resistance which is characterized by the resistance 6 in the drawing. In actual practice, a separate resistor element may not be required when the internal resistance of the basic source is adequate for the voltage dividing purposes hereinafter explained. Alternatively, a separate resistor element may be included in the source when additional resistance is needed for the voltage dividing purpose. In this description, the element 6 is referred to as the total resistance, both internal and supplemental, of the source 1.

As previously inferred, the resistance 6 is one of two resistors of a voltage divider whose mid-terminal is the terminal 3. The other resistor of the voltage divider is the resistor 7 in the drawing, connected between ground and the line 2 at the terminal 3.

The attenuation of this invention is accomplished by the voltage divider comprising the resistance 6 and the resistor 7, and a substitute for the resistor 7 hereinafter described. Hence, the ratio of the resistance 6 to the resistor 7 must be such as to accomplish the desired attenuation at the terminal 3.

In accordance with this invention, the attenuation effected by the voltage divider is varied by substituting a variable thermo-sensitive resistor, or thermistor 10, for the resistor 7. Accordingly, the resistor 7 is connected to the terminal 3 through a switch 11 which is closed in the left position illustrated, and is open when the switch 11 is moved to the right. The thermistor chosen in the embodiment illustrated is one which increases in resistance as its temperature changes from a high temperature towards atmospheric temperature.

Further, the thermistor 10 is connected between ground and a double throw switch 12 which is ganged with the switch 11. When the double throw switch 12 is at the position of its first throw, to the left in the drawing, the thermistor 10 is connected to a source of potential, i.e., heating power, such as B plus. If desired, there may be a resistor 14 in the line from the switch 12 to B plus, chosen to have a resistance such that the current flow through the thermistor 10 will raise it to a temperature at which it has a resistance substantially equal to that of the resistor 7.

When the double throw switch 12 is at the position of its second throw, to the right in the drawing, then the thermistor 10 is connected to the terminal 3, and the switch 11 is open. Hence the thermistor 10 is thereby substituted for the resistor 7 in the voltage divider, and the thermistor 10 is cut off from its supply of heating power from B plus.

As the heat in the thermistor 10 dissipates, the resistance of the thermistor 10 increases, thus changing the voltage division, and reducing the attenuation effected on the signal carried by the line 2.

If it should be desired in a particular application to increase attenuation, rather than decrease it, then a thermo-sensitive element 10 which decreases in resistance as it cools might be used. More easily in some applications, the thermistor 10 previously described might be substituted for a portion of the resistance characterized by the element 6.

It is apparent that the temperature and change in temperatures of the thermo-sensitive resistor may be controlled by any means. It may be either heated or refrigerated either from an external or internal source, and the temperature may be controlled by any means. The most simple embodiment uses a thermo-sensitive resistor which is heated by passage of electric current therethrough. The temperature is "controlled" during the variation of attenuattion by letting the thermo-sensitive resistor cool to atmospheric temperature.

In the preferred embodiment of the invention as applied to control of attenuation of signals derived in geophysical studies upon the firing of a shot, excellent patterns of attenuation can be obtained with a .025 megohm resistance 6 by roper choice of a thermistor which is heated until it has a resistance of perhaps .025 megohm, and cools rapidly, increasing its resistance to perhaps 5 megohms. In such application of the invention, the resistor 7 is chosen to have a resistance of .025 megohm.

When, as in applications of the invention to geophysical work, it is desired to trigger the attenuation variation by the signal to be attenuated, appropriate triggering circuitry may be used as illustrated in the drawing.

The ganged switches 11 and 12 constitute part of a relay and are controlled by an electromagnetic relay control element 16. The control element 16 is in turn activated by power from a thyratron 17 with an anode 18, grid 19 and cathode 20. Conveniently, the cathode 20 may be connected to ground through a cathode resistor 21; the anode 18 may be connected to B plus through an anode resistor 22. The grid 19 may be connected to ground through a grid resistor 23. Conventional biasing means (not shown) may be used in conjunction with the thyratron to bias it to the desired cut off.

In some geophysical applications of the invention, it is desired to delay the operation of the switches 11 and 12 until the passage of the surge of energy resulting from the direct pickup of the shot, and then to throw the switches 11 and 12 from the left in the drawing to the right, so that the attenuation decreases as the reflected signals picked up by the geophones fade during passage of time after the shot. Accordingly, an R-C combination may be used. The resistor 25 of the R-C combination and the capacitor 26 of the R-C combination are both connected to the grid 19 of the thyratron. The capacitor 26 is further connected to ground.

The resistor 25 is connected through a coupling condenser 27 to the anode 28 of a triode 29 having a grid 30 and a cathode 31. Conveniently, the cathode 31 may be connected to ground through a cathode resistor 32 and the anode 28 connected to B plus through an anode resistor 33. The grid 30 is connected to the line 2 preferably ahead of the terminal 3. If the invention is used at the output side of an amplifier stage, the grid 30 is usually connected to the input of the amplifier stage.

*Operation*

From the foreging description of the preferred circuitry embodying the invention, those skilled in the art will understand its operation and a number of alternative elements which may be used for various elements in the invention as particularly described herein.

The ganged switches 11 and 12 are moved to the position illustrated in the drawing, wherein the resistor 7 is connected to the line 2, thereby affecting a predetermined maximum attenuation prior to the firing of the shot. The thermistor 10 is supplied with current from B plus to heat it up to the temperature at which its resistance is substantially equal to that of the resistor 7.

The shot is then set off. The geophone picks up the shot and immediately thereafter the stronger reflections from the uppermost strata being studied. The very large signal derived from the shot is applied, perhaps after some amplification, to the line 2. This same signal is likewise applied to the grid 30 of the tube 29, is amplified appropriately and applied to the grid 19 of the thyratron 17. The thyratron is biased sufficiently to prevent its being fired by the ordinary level of the signal being carried by the line 2 prior to the direct shot signal. The R-C combination 25—26 operates to delay the firing of the thyratron 17 long enough to await the commencement of receipt of reflections from the upper formations in the ground.

The large amplitude direct shot signal causes the thyratron to fire, activating the relay to throw the switch 12 to the second throw position and open the switch 11, thereby substituting the thermistor 10 for the resistor 7, and terminating the heating of the thermistor 10. The thermistor 10 cools and its resistance increases, thereby decreasing the attenuation effected by the divider which is now constituted by the resistance 6 and the thermistor 10.

From the foregoing recitation of the steps of operation of the preferred form of apparatus embodying the invention as disclosed in the drawings, and from the alternative apparatus embodying the invention such as the substitution of thermistor 10 for a portion of the resistance 6 when increased attenuation is desired, it is apparent that the invention can be characterized as a process for varying attenuation comprising the dividing of the signal with a voltage divider, the heating of a thermo-sensitive resistor and storing of heat energy therein, the substitution of the heated thermo-sensitive resistor for one of the resistances in the voltage divider, and finally the release of the heat from thermo-sensitive resistor with resultant change in resistance thereof and change in attenuation.

The most practical form of heat control in most applications of the invention, is simply that of heating the element before substitution in the circuit, and then terminating the heating at the time of subsitution in the circuit, controlling the temperature of the element by permitting it to cool at predetermined rates of speed. Usually, natural cooling in atmosphere can be made to produce the attenuation pattern desired with sufficient accuracy for most purposes, but this is only one form of heat or temperature control or change that is possible and that will be apparent to those skilled in the art.

Modifications may be mad in the invention as herein particularly described without departure from the scope of the invention. For example, switching control means other than that embodied in the tubes 17 and 29 may be used. The pattern of attenuation may be changed by choice of the thermo-sensitive element 10 and by changing the voltage divider ratios. Accordingly the foregoing description is to be construed as illustrative only, and is not to be construed as a limitation upon the invention as defined in the following claims.

I claim:

1. Means for attenuating a signal comprising the combination of a source of signal to be attenuated, said source of signal having a resistance; a line connected to said source of signal and carrying said signal to an output terminal; a coupling condenser interposed in said line between said output terminal and said source of signal; a second terminal interposed in said line between said coupling condenser and said source of signal; a first switch having two terminals, one of which terminals is connected to said second terminal in said line; a first resistor connected between ground and the second terminal of said first switch, whereby a voltage divider is formed with the resistance of said source of signal as one element and said first resistor as a second element; a double throw switch with the pole for its first throw connected to a source of potential and the pole for its second throw connected to said second terminal in said line; a thermistor connected between ground and said double throw switch; said first switch and said double throw switch being ganged whereby said first switch is closed when said double throw switch is in the position of its first throw, and said first switch is open when said double throw switch is in the position of its second throw; electromagnetic means for moving said switches from the position of first throw and closed, respectively, to the position of second throw and open, respectively; a thyratron having anode, grid and cathode; said anode being connected to a source of potential and further connected to supply power to said electromagnetic means; said cathode being connected to ground; means for biasing said thyratron to a predetermined point of cut-off; a second condenser connected between said grid and ground; a second resistor connected also to said grid, said second condenser and said second resistor constituting a resistor-capacitor time delay circuit adapted to delay a signal to be applied to said grid in reaching a potential calculated to fire the thyratron; a thermionic tube with anode, grid and cathode; said cathode being connected to ground; said grid being connected to said source of signal; said anode being connected to a source of potential; a third condenser connected between said anode of said thermionic tube and said second resistor; all whereby a voltage division is effected at said second terminal by the operation of the resistance of said source of signal and said first resistor, and whereby said thyratron does not fire until said signal has reached a predetermined amplitude and become effective upon the grid of said thyratron, whereupon said thyratron fires and said double throw switch is moved to the position of said second throw and said first switch is moved to the open position, thereby substituting said thermistor for said first resistor in said voltage divider and cutting off the source of potential from said thermistor.

2. An attenuator comprising the combination of a source of signal to be attenuated, said source having a predetermined resistance; a first switch with one terminal thereof connected to said source of signal; a first resistor connected between the other terminal of said first switch and ground; a double throw switch connected at the pole of its first throw to a source of potential and at the pole of its second throw to said source of signal; a thermo-sensitive resistor that varies in resistance with variations in its temperature, said thermo-sensitive resistor being connected between ground and said double throw switch whereby said thermo-sensitive resistor is connected to said source of potential when said double throw switch is in its position of first throw, and is connected to said source of signal when said double throw switch is in its position of second throw; means for operating both of said switches together to open said first switch and move said second switch from the position of its first throw to the position of its second throw, thereby substituting said thermo-sensitive resistor for said first resistor, and thereby cutting said thermo-sensitive resistor off from said source of potential.

3. Means for attentuating a signal by amounts varying with a predetermined pattern, comprising a source of signal to be attenuated, said source having a predetermined resistance; a first switch with one terminal thereof connected to said source of signal; a first resistor connected between the other terminal of said first switch and ground, whereby a voltage divider is formed by said first resistor and the resistance of said source of signal when said first switch is closed; a double throw switch connected at the pole of its first throw to a source of potential and at the pole of its second throw to said source of signal; a thermo-sensitive resistor that increases in resistance with decrease in its temperature in a pattern proportional to said predetermined pattern of attenuation; said thermo-sensitive resistor being connected between ground and said double throw switch, whereby said thermo-sensitive resistor is connected to said source of potential when said double throw switch is in its position of first throw, and is connected to said source of signal when said double throw switch is in its position of second throw; means for operating both of said switches together to open said first switch and move said second switch from the position of its first throw to the position of its second throw, thereby substituting said thermo-sensitive resistor for said first resistor as an element in said voltage divider, and thereby cutting said thermo-sensitive resistor off from said source of potential.

4. An attenuator comprising the combination of a source of signal to be attentuated, said source of signal having a predetermined resistance; a first resistor constituting one element in a voltage divider in which the resistance of said source of signal is the other element; a thermo-sensitive resistor that varies in resistance with variations in its temperature, said thermo-sensitive resistor being connected to a source of potential adapted to heat said thermo-sensitive resistor to a predetermined resistance; a relay operated switching means operative when actuated to disconnect said first resistor from said voltage divider, and to disconnect said thermo-sensitive resistor from said source of potential and to connect said thermo-sensitive resistor into said votlage divider as a substitute for said first resistor.

5. The invention defined in claim 4 characterized by the addition of means for activating said relay, such means being responsive to said signal to be attenuated and being adjusted so that said relay will be activated when said signal to be attenuated reaches a predetermined amplitude.

6. Means for attenuating a signal by amounts varying in a predetermined pattern, comprising the combination of a source of signal to be attenuated, said source of signal having a resistance; a first resistor connected to constitute one element in a voltage divider in which the resistance of said source of signal is the other element; a thermo-sensitive resistor that varies in resistance with variations in temperature, said thermo-sensitive resistor being connected to a source of potential adapted to heat said thermo-sensitive resistor to a predetermined resistance; switching means for disconnecting said thermo-sensitive resistor from said source of potential and for substituting said thermo-sensitive resistor for said first resistor in said voltage divider.

7. Means for attenuating a signal by amounts varying in a predetermined pattern, comprising the combination of a source of signal to be attenuated, said source of signal having a resistance; a first resistor connected to constitute one element of a voltage divider in which the resistance of said source of signal is the other element; a thermo-sensitive resistor that varies in resistance with variations in its temperature; means for heating said thermo-sensitive resistor to a resistance substantially equal to that of said first resistor; and means for terminating the heating of said thermo-sensitive resistor and for substituting said thermo-sensitive resistor for said first resistor in said voltage divider.

8. Means for attenuating a signal by amounts varying in a predetermined pattern, comprising the combination of a source of signal to be attenuated, said source of signal having a resistance; a first resistor connected to constitute one element of a voltage divider in which the resistance of said source of signal is the other element; a thermo-sensitive resistor that varies in resistance with variations in its temperature; means for controlling the temperature of said thermo-sensitive resistor so that its resistance is at one time substantially equal to that of said first resistor and at other times varies from the resistance of said first resistor; and means for substituting said thermo-sensitive resistor for said first resistor in said voltage divider.

9. Mean for varying the attenuation of a signal in a predetermined pattern comprising a source of signal to be attenuated; a voltage divider comprising at least two resistance elements with a common terminal, said two resistance elements being connected in series to said source of signal so as to provide a circuit effecting an attenuation of said signal; a thermo-sensitive resistor; means for controlling the temperature of said thermo-sensitive resistor so that its resistance is at one time substantially equal to that of one of the resistance elements of said voltage divider; and mean for substituting said thermo-sensitive resistor into the voltage divider in place of the resistance element of substantially equal resistance; whereby a signal may be attentuated a steady amount by said voltage divider and may upon the substitution into the voltage divider of the thermo-sensitive element be attenuated a varying amount determined by the characteristic of the chosen thermo-sensitive element and the temperature control thereof.

10. The combination comprising a source of signal adapted to put out an electrical signal; at least two resistance elements with a common terminal, said resistance elements being connected in series to said source of signal so as to provide a circuit effecting attenuation of the signal put out by said source of signal; a thermo-sensitive resistor; means for controlling the temperature of said thermo-sensitive resistor so that its resistance at a given time may be caused to become a predetermined resistance value; means for substituting said thermo-sensitive resistor for one of said resistance elements; whereby said signal may be attenuated a steady amount when desired and may be attenuated varying amounts determined by the characteristic of said thermo-sensitive resistor when such resistor is substituted into the circuit.

References Cited in the file of this patent

UNITED STATES PATENTS

| | | |
|---|---|---|
| 2,022,477 | Myers et al. | Nov. 26, 1935 |
| 2,375,283 | Cloud | May 8, 1945 |
| 2,378,620 | Chatterjea et al. | June 19, 1945 |
| 2,586,167 | Kamm | Feb. 19, 1952 |
| 2,599,345 | Oberman et al. | June 13, 1952 |
| 2,600,482 | Collis et al. | June 17, 1952 |
| 2,650,333 | Taylor | Aug. 25, 1953 |
| 2,660,625 | Harrison | Nov. 24, 1953 |
| 2,679,588 | Henry | May 25, 1954 |
| 2,761,130 | Kibler | Aug. 28, 1956 |

FOREIGN PATENTS

| | | |
|---|---|---|
| 394,712 | Great Britain | July 3, 1933 |